Nov. 4, 1969 H. STENGER ET AL 3,476,103

ELECTRICAL AMPLIFIER WITH COMPENSATING CIRCUIT FOR MEASURING PURPOSES, PARTICULARLY FOR ELECTROCARDIOGRAPHS

Filed Sept. 15, 1966 2 Sheets-Sheet 1

INVENTORS
Heinrich Stenger
Herbert Wilimzig
BY Stiee & Stiee
ATTYS.

Nov. 4, 1969 H. STENGER ET AL 3,476,103
ELECTRICAL AMPLIFIER WITH COMPENSATING CIRCUIT
FOR MEASURING PURPOSES, PARTICULARLY
FOR ELECTROCARDIOGRAPHS
Filed Sept. 15, 1966 2 Sheets-Sheet 2

INVENTORS
Heinrich Stenger
Herbert Wilimzig
BY Spiel & Spiel
ATTYS.

United States Patent Office 3,476,103
Patented Nov. 4, 1969

3,476,103

ELECTRICAL AMPLIFIER WITH COMPENSATING CIRCUIT FOR MEASURING PURPOSES, PARTICULARLY FOR ELECTROCARDIOGRAPHS

Heinrich Stenger and Herbert Willmzig, Karlsruhe, Germany, assignors to Siemens Aktiengesellschaft, Munich, Germany, a corporation of Germany Filed Sept. 15, 1966, Ser. No. 579,755
Claims priority, application Germany, Sept. 16, 1965, S 99,465
Int. Cl. A61b *5/04;* A61n *1/18;* H03g *3/30*
U.S. Cl. 128—2.06 5 Claims

ABSTRACT OF THE DISCLOSURE

A transistorized electrocardiograph amplifier in which the input is connected in a DC manner with the electrodes and blocking condensers are provided at the amplifier output, the voltage supply of the amplifier including a voltage step-up circuit, being so designed that DC signals greatly exceeding the measuring signal will not overmodulate the amplifier, and the base currents of the transistors of the input stage of the amplifier are compensated by currents derived from the voltage supply by means including a potentiometer.

The invention relates to an electrical measuring apparatus, in particular, an electro-medical device, for example, an electrocardiograph. Such measuring apparatus contain a transistor amplifier and coupling capacitors for isolating or blocking of direct voltages of a source and for determining the lower limit frequency. In the case of an electrocardiograph, the source is formed by the patient.

It is a known feature to arrange coupling capacitors at the input of the amplifier. However, since the patient possesses a variable resistance value, possibly even fluctuating with time, difficulties with regard to the maintenance of the prescribed time-constants of the amplifier arise in such circuit arrangement. Furthermore, as is well known, electrocardiographs include means for instant starting which is disposed at the input of the amplifier, in this case serving as a pre-amplifier. In order to be able to observe the recharging time at such rapid start, it is in most cases necessary to utilize graduated coupling capacitors with regard to which the charge-compensation at such start can take place quickly without influencing the following cooperable amplifier.

The difficulties regarding the observation of the previously given recharging time of the amplifier occur in the described known circuit arrangement particularly with respect to high leakage resistances. While smaller coupling capacitors would keep the recharging time small, smaller capacitors would require very high ohmic inputs of the first amplifier stage because of the required lower limit frequency.

In pre-amplifiers in electrocardiographs, equipped with tubes, therefor, the coupling capacitors are disposed, not at the input of the pre-amplifier, but following the first tube stage thereof. The elements determining the recharging time of the amplifier thus are decoupled from the fluctuating resistance value of the patient by the first tube stage.

It is the purpose of the invention to provide an electrical measuring apparatus with a transistor amplifier which may be utilized as a pre-amplifier, in which arrangement coupling capacitors likewise are provided, but so arranged that the required recharging time of the amplifier is not influenced in a disadvantageous manner by the varying resistance which may be connected to the input of the transistor amplifier. The measuring arrangement according to the invention is characterized in that the source such as a patient, is connected with the amplifier input in a direct-current manner with the coupling capacitors arranged at the amplifier output, and furthermore, the voltage supply of the transistor amplifier is designed with regard to linear amplification of the direct voltages located at the amplifier input, and in which a current is conducted to the source which at least partially compensates the input current of the transistors amplifier flowing through such source.

As is evident, the object of the invention is not simply the arrangement of the coupling capacitors, known in connection with the tube amplifiers, at a place remote from the input of the amplifier, but in the provision of additional measures which comprise the utilization of a voltage supply sufficient for the linear direct-voltage amplification, and the compensation of the base current, of the first transistor stage, flowing through the patient. Linear voltage amplification is required so that the direct voltages occurring at the patient do not block the amplifier for alternating voltage signals. In electro-medical instruments, such direct voltages result from the fact that the collecting electrodes of the instrument together with the skin of the patient, form galvanic elements.

The base current of the input stage of the transistor amplifier, flowing over the patient, effects a change in the zero-position in the diagram recorded by the instrument, which is particularly disturbing when the resistance value of the patient changes during the measurements. In order to eliminate this factor, according to a feature of the invention two currents, opposing one another, and at least approximately of equal size, are conducted through the patient, one of which is the base current of the amplifier input and the other of which is a current which compensates such base current.

It will be appreciated that while transistors of high value with small base current can be utilized for the diminution of the current flowing over the patient, such transistors are very expensive.

It will be appreciated that references in the following disclosure to electro-medical instruments, in particular electrocardiographs, merely involve explanatory examples and are not intended to indicate a restriction to such instruments. On the contrary, the invention may be utilized wherever an amplifier with a certain time-constant is involved and coupling capacitors are to be used for the connection of a source having a variable resistance.

A suitable voltage supply for the linear direct-voltage amplification in a battery powered measuring apparatus, for example, a battery powered portable electrocardiograph, may be obtained in an advantageous embodiment of the invention, in which the measuring apparatus includes an oscillator, as well as a transformer with a following rectifier circuit, and may have, in addition, a smoothing circuit for the voltage supply enabling the linear direct-voltage amplification. Consequently, the supplying of the transistor amplifier does not, in this case, take place directly from the battery, but from a high voltage transformation circuit which comprises a vibrator, a high voltage transformer and a following rectifier circuit.

The current for compensating the base current, of the first amplifier stage, flowing over the patient may be derived from the voltage supply of the amplifier. In other words, in a battery powered measuring apparatus with an oscillator, as above described, such compensating current can be taken from the secondary side of the transformer.

If the transistor amplifier is constructed as a push-pull amplifier, the coupling capacitors can be connected to its output over a transistor stage, in collector-base circuit, with a potentiometer for the adjustment of symmetry with respect to ground. There thus is achieved a true transistor amplifier which is not loaded through the coupling capacitors by the associated resistances.

With regard to a feedback amplifier in a push-pull circuit where the coupling capacitors are connected to the output of the amplifier directly or over resistances, the adjustment of the symmetry with respect to ground is superfluous if the emitter current of the last amplifier stage representing the feedback current is made load-independent by means of a transistor, in emitter-base circuit, lying in the feedback circuit for in-phase interference signals.

In the drawings, wherein like reference characters indicate like or corresponding parts:

Figure 1:
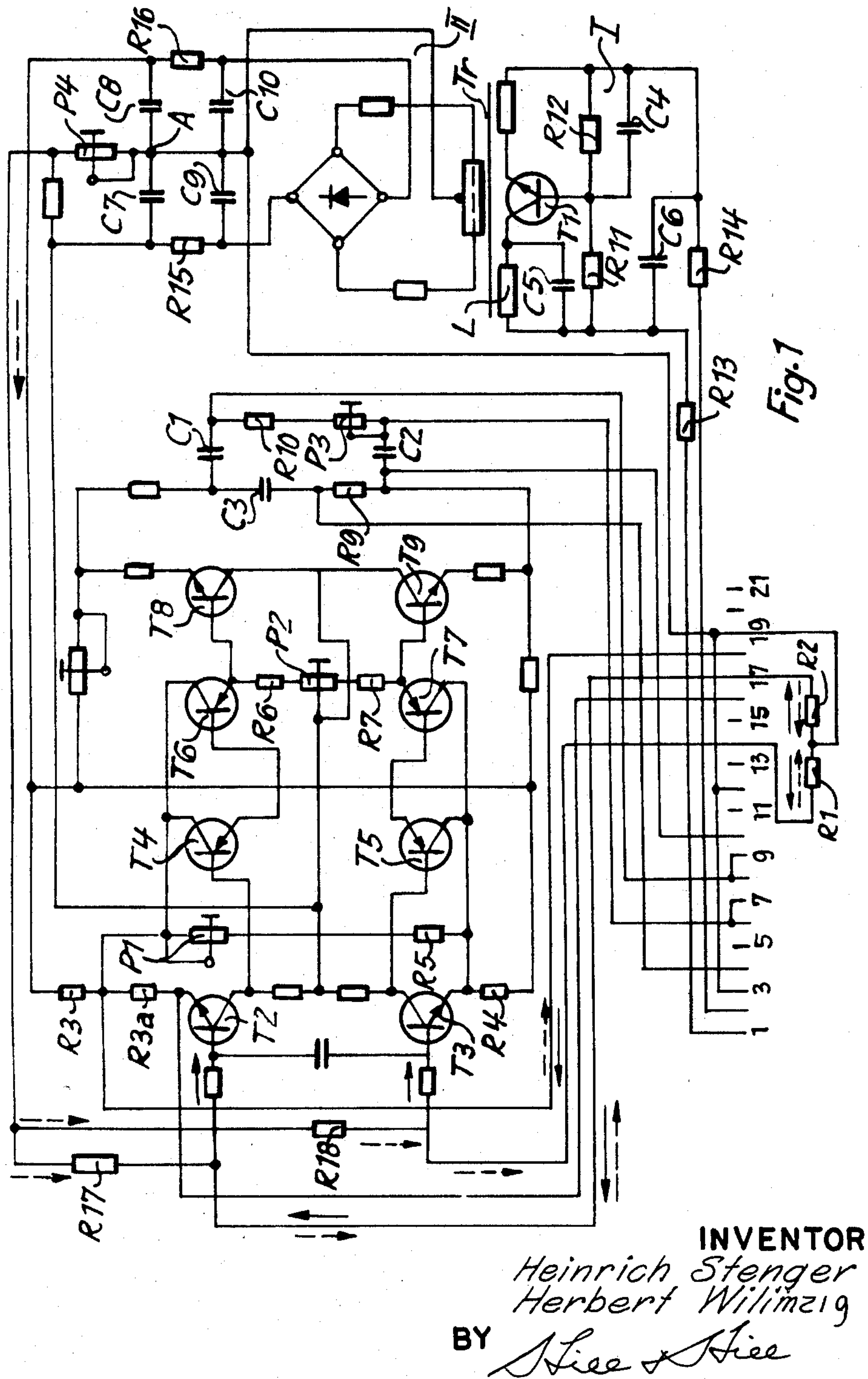
FIG. 1 is a schematic diagram of a circuit embodying the invention.

FIG. 1 illustrates a first embodiment of a measuring apparatus according to the invention, for example, of an electrocardiograph, in particular the portions necessary for an understanding of the invention. The circuit diagram shows the actual pre-amplifier, containing the transistors T2 to T9, to the output of which the coupling capacitors C1 and C2 are connected. In the right part of the figure is illustrated the oscillator I which forms the voltage supply for the pre-amplifier over the circuit, indicated generally by the reference numeral II, which steps up and rectifies the oscillator voltage, with the patient to be examined being represented in the circuit by the resistances R1 and R2. The patient is connected with the bases of the input transistors T2 and T3 of the pre-amplifier, connected as feedback, push-pull amplifier, over the input terminals 14 and 17. The connecting point of the two resistances R1 and R2 representing the patient, connected to terminal 19 lies on the reference-potential (ground potential) of the amplifier circuit.

The emitter resistances R3 and R4 of the two input transistors T2 and T3 are located on the feedback circuit for in-phase interference signals. This constitutes an overall feedback which proceeds from the transistors T6 and T7 of the output stage of the preliminary amplifier, disposed in emitter-base circuit. Located in the emitter circuit of the transistor T2 of the input stage of the amplifier, is an additional resistance R3*a* which, however, is disposed outside the corresponding feedback circuit, and serves for the supplying of calibration signals which are obtained in a circuit not illustrated in the drawing. Such calibration signals should be supplied externally of the feedback circuits so that they are not suppressed by the feedback in the same manner as the interference signals.

While the feedback resistances R3 and R4 in the emitter circuits of the transistors T2 and T3 serve for the feedback of in-phase interference signals, the potentiometer P1 and the resistance R5 constitute the amplification determining resistances for the counterphase signal. The potentiometer P2, in connection with the resistances R6 and R7, provides a fine adjustment of the ground symmetry. The remaining resistances in the circuit of the transistor amplifier not specifically designated in the figure serve, in a manner known per se, for the adjustment of the operating points of the individual transistors.

Shunting the amplifier output at the input sides of the coupling capacitors C1 and C2 is a frequency determining network comprising the capacitor C3 and the resistance R9, which determines the upper limit-frequency of the amplifier.

For the adjusting of the time constant of the amplifier, resistance R10 and potentiometer P3 are associated with the output sides of the coupling capacitors C1 and C2. The outputs of the circuit containing the coupling capacitors are conducted to the output terminals 7 and 9 which are, for example, over a subsequently connected direct current amplifier and other circuit components connected with the recording apparatus of the electrocardiograph.

The battery, not illustrated, for the voltage supply of the amplifier is connected to terminals 1 and 2. Since the coupling capacitors C1 and C2 are not located ahead of the input of the amplifier, i.e., not in the base lines of the transistors T2 and T3, it is necessary to so proportion the amplifier that the direct voltages, derived from the patient represented by the resistances R1 and R2, cannot overload the amplifier. For this reason the battery voltage is not conducted directly to the individual transistors of the amplifier, but first of all to the oscillator I the frequency of which is determined by the capacitor C5 and the inductance L of the transformer T*r*. The resistances R11 and R12 determine the operating point of the transistor T1, C4 bridges resistance R12 for determining the oscillator frequency, while the capacitor C6 together with the resistances R13 and R14 forms a filter. The transformer T*r* steps up the voltage at the primary windings and the secondary voltage of the transformer T*r* is rectified in the rectifier circuit II. The rectifier circuit II per se, as well as the smoothing circuit formed by the capacitors C7 to C10 and the resistances R15 and R16 are known and, therefore, are not explained in detail.

In contrast to tube amplifiers which, as is known, draw only negligible grid currents at their input, it is necessary in connection with transistor amplifiers to take steps to eliminate the influence of the base currents of the input transistors T2 and T3, disturbing the measurements, which base currents flow over the patient R1, R2. These currents are represented by the solid arrows in the left part of FIG. 1. Such base currents, flowing over the patient, cause voltages at the patient which lead to a disturbance of the zero-position of the amplifier and thereby of the diagram to be produced, especially with regard to the customary resistance changes of the patient. For this reason, there is conducted to the patient the compensating current, represented in the figure by the broken-line arrows, over the connections 14 and 17, which compensating current flows through the patient in the opposite direction to that of the base currents of the input transistors T2 and T3 and which is, if possible, made equal to such disturbing currents in the patient. Since the circuit point A is connected with the patient over the terminal 19, the potentiometer P4 can be considered as the source for such compensating current. Consequently this potentiometer permits an adjustment of the value of the compensating current to that required in view of the base currents of the transistors T2 and T3. Since the input resistances of the transistors T2 and T3 are relatively high, the compensating current flows over the resistances R17 and R18 as well as over the patient-formed resistances R1 and R2.

Figure 2:
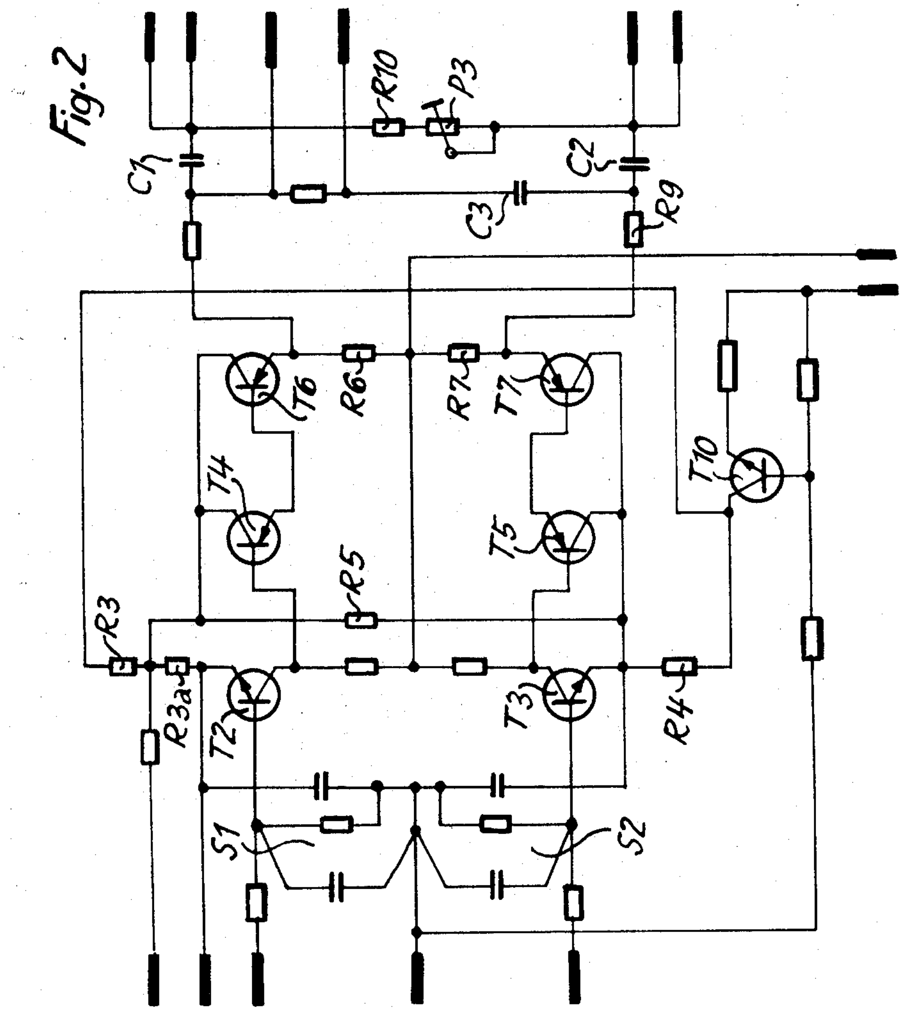
FIG. 2 is a schematic diagram corresponding to a portion of the circuit of FIG. 1, illustrating a modification thereof.

FIG. 2 illustrates a variation of the circuit arrangement according to the invention in which the potentiometer P2 serving for the adjusting of the ground-symmetry as well as the two transistors T8 and T9 in the emitter-base circuit in FIG. 1 are replaced by a transistor T10 in the emitter-base circuit. The circuitry providing the supply voltage and for obtaining the compensating current. The individual circuit elements, as far as they correspond to those in FIG. 1, are provided with the same reference characters.

The transistor T10 is located in the feedback circuit for in-phase interference signals, which feedback circuit again includes the emitter resistances R3 and R4 in the emitter circuit of the transistor T2, with the resistance R3*a* being arranged analogous to that of FIG. 1 for supplying calibration signals, externally of the feedback circuit.

The high frequency filter networks, designated S1 and S2, are disposed at the symmetrical input of the amplifier, i.e., between the base connections of the transistors T2 and T3.

The invention is not restricted to the embodiments illustrated in the figures. For example, it is possible to utilize an amplifier with a different cardiograph. The novel circuit arrangement may thus be employed wherever an amplifier with determined time constant is to be capacitively coupled to resistances which may have varying values which are not supposed to have any influence upon the time constant.

It will be understood that variations and modifications may be effected without departing from the spirit and scope of the novel concepts of this invention.

We claim:

1. An electrical measuring circuit, in particular an electro-medical device such as an electrocardiograph, including a transistor amplifier and coupling capacitors for blocking the direct voltages of a source, such as a patient, comprising means adapted to be connected to the source for connecting such a source with the amplifier input in a direct-current manner, such coupling capacitors being disposed in the amplifier output, voltage supply means for said amplifier arranged for cooperation with said amplifier to provide a linear amplification of the direct voltages at the amplifier input, and means for connecting said voltage supply means with the input of said transistor amplifier whereby a current may flow in the amplifier input circuit, including such a source, which compensates the input current, of the transistor amplifier, flowing at least partially through such a source.

2. A measuring arrangement according to claim 1, wherein said voltage supply means includes a battery comprising in further combination, a voltage supply arrangement operatively connected to said battery and comprising an oscillator, a transformer operatively connected to the output of said oscillator, and a rectifier circuit operatively connected to said transformer, said battery and voltage supply arrangement forming said voltage supply means for said amplifier.

3. A measuring arrangement according to claim 1, wherein said compensating current is derived from the voltage supply of the amplifier by voltage divider means connected to said supply.

4. A measuring arrangement according to claim 1, wherein said transistor amplifier is constructed as a push-pull amplifier, a transistor stage, in collector-base circuit, by means of which said coupling capacitors are connected to the amplifier output, and a potentiometer cooperable with said transistor stage forming means for adjusting the output symmetry with respect to ground.

5. A measuring arrangement according to claim 1, wherein the transistor amplifier is constructed as a feedback push-pull amplifier, to the output of which the coupling capacitors are connected, with the emitter current of the last amplifier stage constituting the feedback current, and means including a transistor in emitter-base circuit for operatively applying the feedback current to said amplifier.

References Cited

UNITED STATES PATENTS

| | | | |
|---|---|---|---|
| 2,638,401 | 5/1953 | Lukacs | 128—2.06 X |
| 3,029,808 | 4/1962 | Kagan | 128—2.06 |
| 3,255,753 | 6/1966 | Wing | 128—421 |
| 3,371,286 | 2/1968 | Lovelace | 330—15 X |

WILLIAM E. KAMMA, Primary Examiner

U.S. Cl. X.R.

330—25